H. DALITZ.
SINK STRAINER.
APPLICATION FILED DEC. 27, 1921.
1,438,364.
Patented Dec. 12, 1922.
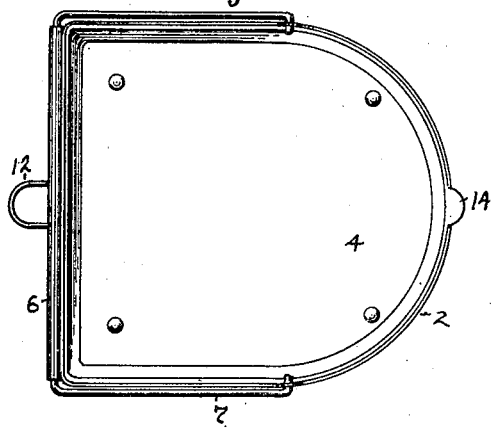
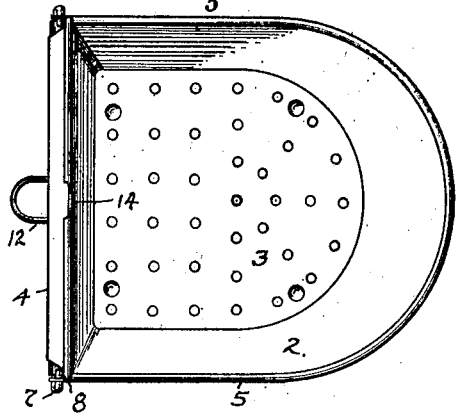
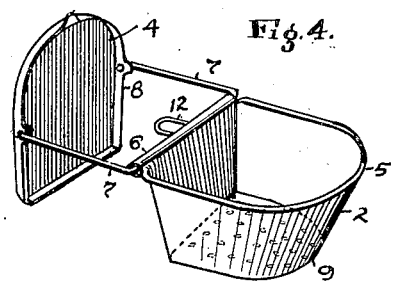
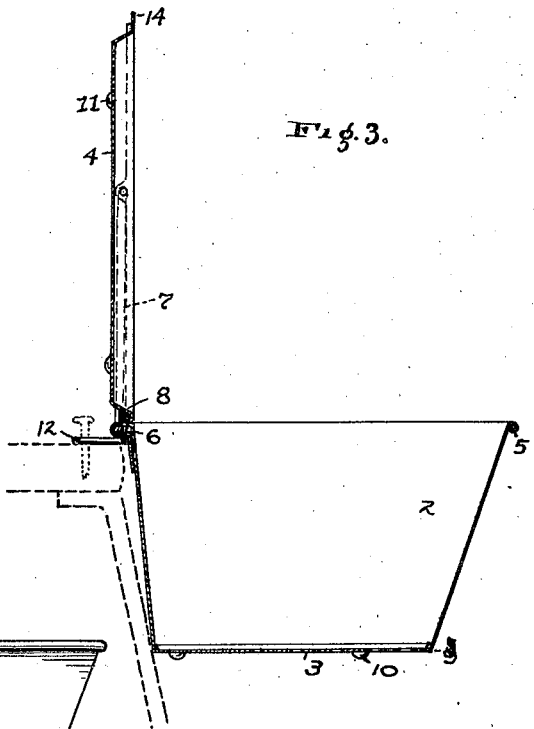
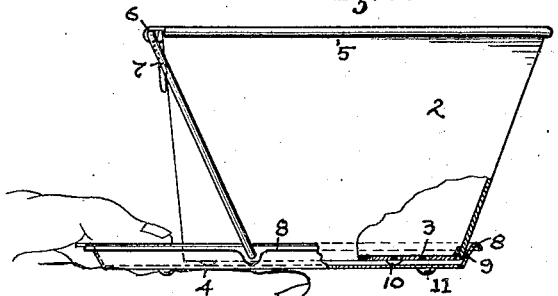
Inventor
HARRY DALITZ.

Patented Dec. 12, 1922.

1,438,364

UNITED STATES PATENT OFFICE.

HARRY DALITZ, OF CLEVELAND, OHIO, ASSIGNOR TO THE C. AND D. MFG. COMPANY, OF CLEVELAND, OHIO, A CORPORATION OF OHIO.

SINK STRAINER.

Application filed December 27, 1921. Serial No. 525,219.

*To all whom it may concern:*

Be it known that I, HARRY DALITZ, a citizen of the United States, residing at Cleveland, in the county of Cuyahoga and State of Ohio, have invented certain new and useful Improvements in a Sink Strainer, of which the following is a specification.

The general object of this invention is to provide a sink strainer or garbage receptacle, with a closure member adapted to support and cover the perforated bottom of the receptacle so that the device may be carried in the hand and the contents prevented from leaking and dripping to the floor and person while being conveyed for deposit elsewhere. As constructed the closure member is hinged to permit it to be used as a lid or cover for the top side of the receptacle, and to permit it to be quickly and conveniently shifted underneath the perforated bottom and to extend to one side thereof where it may be grasped and held in one hand. The closure member has the form of a shallow dish and in shifting it from the top of the receptacle to the bottom this member is inverted to permit the perforated bottom to rest within the concaved side of the dish, so that liquid drippings will be caught and held temporarily as in a pan or tray.

In the annexed drawing, Fig. 1 is a top view of my improved sink strainer closed, and Fig. 2 is a similar view but open, the closure member standing upright as shown in Fig. 3, which is a vertical section centrally through the receptacle and its closure member. Fig. 4 is a perspective view, on a smaller scale, of the sink strainer, with the closure member in the swinging position which it takes in shifting form top to bottom and vice versa. Fig. 5 is a side view, partly in section, of the device showing the closure member nesting the bottom end of the receptacle and suppored by a hand.

The invention comprises a sheet metal receptacle 2 of any suitable shape having a perforated bottom 3 and a dished cover or closure member 4. Bottom 3 is preferably smaller than the open top and the sides slope upwardly and outwardly to a wired rim or bead 5, which is straight at the rear side of the body to provide a hinge section 6 for a spring wire loop or bail 7, which serves to hinge member 4 to the receptacle. To that end the outer ends of the parallel arms of this bail are bent inwardly to pivotally connect with the raised border flange 8 centrally at each side of closure member 4, and the fulcrum or hinge point of the bail being at the rear end and upper corner of the receptacle the closure member is adapted to be turned down to rest upon and completely cover the open top side of the receptacle and to swing upwardly to an upright position when access to the receptacle is desired, see Fig. 3. In addition, the cover or closure member 4 may be turned completely beneath the bottom side of the receptacle body, and in so doing dished member 4 is inverted so that the perforated bottom end of the receptacle will rest within its depressed side with the front corner 9 thereof frictionally engaged with flange 8 of member 4. Bottom 3 is also provided with a number of small protuberances 10 adapted to serve as supports or rests, and similar protuberances 11 may be formed on member 4 for the same purpose. A loop or eye 12 is provided at the rear side and upper edge of the receptacle to hang or support the receptacle upon a nail or hook. substantially as shown in dotted lines in Fig. 3, and the front rounded edge of the lid or closure member 4 has a lip or projection 14 adapted to be engaged by the finger in lifting or tilting the cover.

When the receptacle is to be emptied it is first bodily lifted from its place of rest to permit the closure member to be turned rearwardly with the bail and thence downwardly until the receptacle is placed within and upon the dished side of said member. The bottom end of the receptacle being smaller than closure member 4 an ample portion of the latter will project at the rear to give a substantial hand hold, as delineated in Fig. 5. Thus, member 4 serves both as a cover or lid to close the top of the receptacle and as a tray to carry the receptacle and catch the drippings when filled with garbage.

What I claim, is

1. A garbage receptacle having a strainer bottom, a bail pivotally connected with said receptacle, and a flanged closure member for the top side of said receptacle pivotally connected to said bail and adapted to swing to an inverted position beneath said strainer bottom.

2. A garbage receptacle having a strainer bottom and a closure member hinged to swing beneath said bottom with one end of said member extending beyond said bottom to afford a hand grip.

3. A garbage receptacle having a perforated bottom of smaller area than its open top side, a dished cover adapted to close said top side, and pivoted connections for said cover adapted to permit said cover to swing into an inverted carrying position beneath said perforated bottom with one end of said cover extending a substantial distance beyond one edge of said bottom.

In testimony whereof I affix my signature.

HARRY DALITZ.